United States Patent [19]

Fitch et al.

[11] 3,786,426

[45] Jan. 15, 1974

[54] DATA CHARACTER DECODER WITH PROVISION FOR DECODING BEFORE ALL CHARACTER ELEMENTS ARE RECEIVED

[75] Inventors: Scott McDowell Fitch, Holmdel; Alfonso Vincent Gallina; Otto Frederick Gerkensmeier, both of Freehold; Peter Stephen Warwick, Middletown, all of N.J.

[73] Assignee: Bell Telephone Laboratories, Incorporated, Murray Hill, N.J.

[22] Filed: Aug. 24, 1970

[21] Appl. No.: 66,623

Related U.S. Application Data

[62] Division of Ser. No. 641,954, May 29, 1967.

[52] U.S. Cl. .......................... 340/172.5, 340/174 SR

[51] Int. Cl. ....... G06f 7/00, G11c 5/12, G11c 19/00

[58] Field of Search .......................... 178/2; 235/154; 340/174 A, 174 DB, 174 SR, 174 LC, 174 MC, 172.5

[56] References Cited

UNITED STATES PATENTS

| | | | |
|---|---|---|---|
| 3,290,665 | 12/1966 | English | 340/174 SR |
| 3,462,749 | 8/1969 | Mecklenburg et al. | 340/174 SR |
| 3,398,403 | 8/1968 | Ostendorf, Jr. | 340/172.5 |
| 3,374,309 | 3/1968 | Elich et al. | 178/2 |

*Primary Examiner*—Harvey E. Springborn
*Attorney*—Roy C. Lipton

[57] ABSTRACT

A transfluxor magnetic core dual rail shift register arranged for storing data character elements. Decoding circuits examine the stored data elements and provide a decoding function after all of the elements of a character have been accepted and, alternatively, after most but not all of the character elements have been received.

2 Claims, 1 Drawing Figure

PATENTED JAN 15 1974 3,786,426
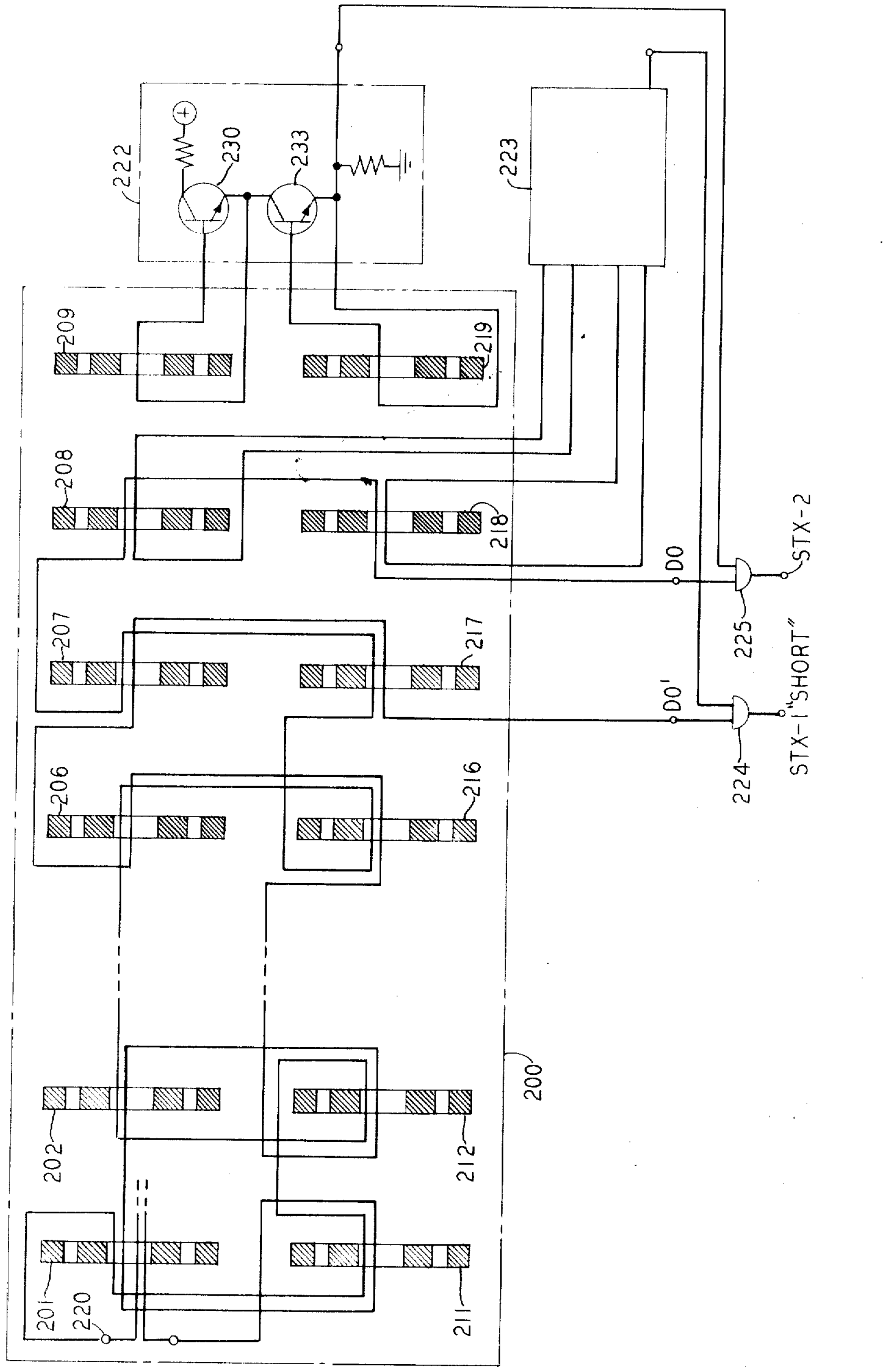

DATA CHARACTER DECODER WITH PROVISION FOR DECODING BEFORE ALL CHARACTER ELEMENTS ARE RECEIVED

CROSS REFERENCE TO RELATED APPLICATION

This application is a division of our copending application, Ser. No. 641,954, filed May 29, 1967 and now abandoned.

FIELD OF THE INVENTION

This invention relates to data systems and, more particularly, to data decoders for recognizing or decoding incoming and outgoing multielement data code characters.

DESCRIPTION OF THE PRIOR ART

In systems wherein data messages are collected from data station transmitters it is sometimes advantageous to connect the several transmitters to a common party or multistation line. To preclude contention between the transmitters for the common line, a master controller is utilized to selectively control the station transmitters. Each station is preferably arranged to respond to queries from the master controller by advising the controller whether a message is available in the transmitter thereat. In addition, where the system provides preferential treatment of certain data messages, each station is preferably arranged to further respond by indicating the level of priority of the available message. Finally, the station transmitter can be started and stopped by commands from the master controller and by supervisory signals in the data message itself, detected while the message is being transmitted.

The functions of storing and decoding incoming command data is substantially identical to the functions of storing and decoding the local outgoing data. Certain of the requirements may differ, however. For example, when incoming data is received, care must be taken to examine the data for assurance that no errors occur in the line transmission or in the local reception. The complete character code, including the various information element bits and parity element bits should, therefore, be fully stored prior to the decoding operation. When local data is examined, however, it is sometimes necessary to provide early decoding action. For example, when the local transmitter generates an outgoing character which also instructs the transmitter to stop, the slow operating clutch magnet of the mechanical transmitter must be de-energized an interval prior to the completion of the generation of the character. Thus, when decoding locally generated data, the safeguard of examining a full character is sometimes eliminated to obtain early decoding action. With these differing requirements present, separate stores and decoding circuits are provided although the functions of each are otherwise the same.

SUMMARY OF THE INVENTION

The object of this invention is to provide alternative normal and early decoding of characters in a common store.

The invention contemplates a store for accepting and storing data character elements together with decoding circuits for examining the stored data elements and indicating the storage of predetermined data characters. Certain of the decoding circuits perform the function of examining the elements in the store after all the elements of the character have been accepted. Other decoding circuits, however, are arranged to operate before the store has accepted all the character elements. This satisfies the differing requirements noted above, permitting the utilization of a common store for alternatively accepting incoming data or outgoing data locally generated.

The store advantageously comprises a shift register for accepting the incoming and locally generated data. The shifting of an initial element to a final one of the shift register stages indicates the full storage of a character and enables certain ones of the decoding circuits to examine the several stages of the shift register prior thereto. In accordance with a feature of this invention, the shifting of the initial element of the data character to an intermediate stage of the shift register enables another decoding circuit to examine the stages prior to the intermediate stage.

The foregoing objects and features of this invention will be more fully understood from the following description of an illustrative embodiment thereof taken in conjunction with the accompanying drawings.

BRIEF DESCRIPTION OF THE DRAWINGS

The drawing discloses the circuitry of a common store which provides normal and early data decoding in accordance with this invention.

DETAILED DESCRIPTION

The common store shown in the drawing is advantageously employed in conjunction with a data station in the same manner as store 106 is employed in the data station disclosed in our application, Ser. No. 641,954, filed May 29, 1967, and now abandoned. Included in the common store, hereinafter also referred to as store 106, is a dual rail shift register, generally indicated by block 200, and AND gates 222 through 225. Dual rail shift register 200 includes a mark element shift register, which shift register includes transfluxor magnetic cores 201 through 209 and a space element shift register which includes transfluxor magnetic cores 211 through 219.

In the disclosed arrangement the data characters referred to hereinafter comprise ASCII code for teletypewriter use, which code comprises a spacing start signal followed by seven mark and space intelligence elements, a parity bit element and two final marking stop elements. It is noted that the shift registers include nine stages, suitable for concurrently storing the start element, the seven intelligence elements and the parity bit element. Each shift register further includes transfer cores, input priming windings and output windings, which are not shown. The details of the shift registers, including the additional cores and windings, are disclosed in an application by G. E. Larson, Ser. No. 578,737, which was filed Sept. 12, 1966 and issued as U.S. Pat. No. 3,509,327 on Apr. 28, 1970.

In accordance with the Larson application, incoming data character signals are scanned by a clock circuit. When the START signal or element of the character is recognized, a double "1" bit is inserted in both core 201 of the mark store and core 211 of the space store. Thereafter the clock circuit inserts a "1" bit in core 201 of the mark store when a mark element is scanned and a "1" bit in core 211 of the space store when a space element is scanned. The clock circuit also functions to shift the character elements through the store until the START signal element represented by the double "1" bit is passed to cores 209 and 219. As disclosed in detail in the Larson application, the setting of cores 209 and 219 provides enabling voltages to the bases of transistors 230 and 233 in AND gate 222. This raises the potential of the emitter of transistor 233, passing an enabling potential therefrom to one input of AND gate 225. The enabling of AND gate 225 indicates that a full character is stored in shift register 200.

Decoding of the character in store 106 is provided by various detector leads which terminate on terminals, such as terminals DO and DO'. Starting with terminal DO, the lead extending therefrom is wound through core 218 and then core 208. Continuing to trace the lead, it then is threaded through the prior cores of both the mark store and the space store, finally terminating at terminal 220. At terminal 220 the lead may extend to a source of constant voltage, such as ground, or may be connected to bias windings threaded through certain ones of the cores and then connected to ground, as disclosed in detail in the application of G. E. Larson. The manner in which the windings are threaded through the cores provides various increments of aiding and opposing voltage induced thereon as the elements of various characters are shifted into the store to set the several cores whereby the lead reads the binary elements in the first eight stages of the store. When a predetermined character, such as the start-of-text character STX, is fully inserted in the first eight stages, the aiding voltages induced on the windings connected to the lead extending from terminal DO exceed the opposing voltages and a positive pulse is provided to AND gate 225. Concurrently, the start bits are inserted in cores 209 and 219, whereby AND gate 222 enables AND gate 225. A pulse is thus provided to the output of gate 225 and, therefore, to terminal STX-2. Thus, the detector lead terminating on terminal DO provides a decoding function by pulsing the terminal when the start-of-text character is received by store 106 and AND gate 222 enables the readout of the pulse to terminal STX-2 via AND gate 225 when the character is fully stored.

As previously described, store 106 decodes the start-of-text character before it is fully stored. This is provided by AND gates 223 and 224 and the lead connected to terminal DO'. Examining the lead extending from terminal DO', it is seen that this lead extends to windings threaded through the first seven stages of shift register 200 in the same manner as the windings extending to terminal DO are threaded through the the first eight stages, whereby the lead reads the binary elements in the first seven stages of the store. Accordingly, when the first seven elements of the end-of-text character are inserted in the shift register a positive pulse is provided to output terminal DO'. An examination of the parity bit is, of course, not included with the short detection. Insofar as the character is being received from the local transmitter, as previously described, and the early decoding is advantageous, the elimination of the safeguard of examining the parity bit can be tolerated to obtain the advantage of the early action.

To enable gate 224 for the early decoding, AND gate 223 is operated when the double START signal element represented by the "1" bit is shifted to cores 208 and 218. This is true since AND gate 223 is arranged in the same manner as AND gate 222 and, further, since it is connected to cores 208 and 218 in the same manner as AND gate 222 is connected to cores 209 and 219. Thus, when the first seven intelligence elements of the start-of-text character STX is inserted in magnetic core shift register 200 and the double "1" bit corresponding to the START element is shifted to cores 208 and 218, AND gate 224 is enabled to pass a pulse to output terminal STX-1 "SHORT". This provides the early decoding of the start-of-text character which is utilized as previously described.

Although a specific embodiment of this invention has been shown and described, it will be understood that various modifications may be made without departing from the spirit of this invention.

We claim:

1. In combination, a multistage shift register for receiving binary elements of data code characters, first decoding means for reading the binary elements stored in a plurality of stages immediately preceding a final one of the stages of the shift register, means responsive to the shifting of a binary element to the final stage for enabling the first decoding means, second decoding means for reading the binary elements stored in a plurality of stages immediately preceding an intermediate one of the stages, and means responsive to the shifting of a binary element to the intermediate stage for enabling the second decoding means, and wherein the shift register stages include magnetic cores and the first and second decoding means include leads wound through the various cores defining the stages preceding the final one and the intermediate one, respectively, of the regiyter stages.

2. In combination, in accordance with claim 1, wherein each enabling means includes a winding wound through a core defining the register stage to which the enabling means is responsive and gate means responsive to signals on the winding for reading out pulses detected by the corresponding decoding means.

* * * * *